United States Patent
Gupta et al.

(10) Patent No.: US 8,289,839 B2
(45) Date of Patent: Oct. 16, 2012

(54) SCALING BFD SESSIONS FOR NEIGHBORS USING PHYSICAL / SUB-INTERFACE RELATIONSHIPS

(75) Inventors: Puneet Gupta, Sunnyvale, CA (US); Sunil K. Srivastava, Fremont, CA (US); David Ward, Somerset, WI (US); Reshad Rahman, Ottawa (CA); David Toscano, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 819 days.

(21) Appl. No.: 11/825,389

(22) Filed: Jul. 5, 2007

(65) Prior Publication Data

US 2009/0010171 A1    Jan. 8, 2009

(51) Int. Cl.
*G06F 11/22* (2006.01)

(52) U.S. Cl. .................................... 370/217; 370/225

(58) Field of Classification Search ........... 370/216–228
See application file for complete search history.

(56) References Cited

U.S. PATENT DOCUMENTS

| | | | |
|---|---|---|---|
| 4,684,872 A | 8/1987 | Stewart | |
| 5,953,049 A | 9/1999 | Horn et al. | |
| 6,016,430 A | 1/2000 | Shinomiya | |
| 6,044,081 A | 3/2000 | Bell et al. | |
| 6,253,270 B1 | 6/2001 | Ajanovic et al. | |
| 6,275,889 B1 | 8/2001 | Saito | |
| 6,311,288 B1 * | 10/2001 | Heeren et al. ................. | 714/4.2 |
| 6,545,979 B1 | 4/2003 | Poulin | |
| 6,590,867 B1 | 7/2003 | Ash et al. | |
| 6,628,608 B1 * | 9/2003 | Lau et al. ...................... | 370/218 |
| 6,771,644 B1 | 8/2004 | Brassil et al. | |
| 6,876,632 B1 | 4/2005 | Takeda | |
| 6,947,417 B2 | 9/2005 | Laursen et al. | |
| 7,422,330 B2 | 9/2008 | Magaril | |
| 2002/0014282 A1 | 2/2002 | Andersson et al. | |
| 2002/0051464 A1 | 5/2002 | Sin et al. | |
| 2002/0186661 A1 | 12/2002 | Santiago et al. | |
| 2003/0016627 A1 | 1/2003 | MeLampy et al. | |
| 2003/0035384 A1 | 2/2003 | Cline et al. | |
| 2003/0076850 A1 | 4/2003 | Jason, Jr. | |
| 2003/0163272 A1 | 8/2003 | Kaburlasos et al. | |
| 2004/0052259 A1 | 3/2004 | Garcia et al. | |
| 2004/0073690 A1 | 4/2004 | Hepworth et al. | |
| 2004/0213152 A1 | 10/2004 | Matuoka et al. | |
| 2005/0007959 A1 | 1/2005 | Tomonada et al. | |
| 2005/0091190 A1 | 4/2005 | Klemets et al. | |
| 2006/0077891 A1 * | 4/2006 | Smith et al. .................... | 370/220 |
| 2007/0008896 A1 | 1/2007 | Green et al. | |
| 2007/0121523 A1 | 5/2007 | Morandin | |
| 2007/0192459 A1 * | 8/2007 | Horimoto et al. ............. | 709/223 |

FOREIGN PATENT DOCUMENTS

EP    1 553 735 A1    7/2005

* cited by examiner

*Primary Examiner* — Michael Thier
*Assistant Examiner* — Curtis A Alia
(74) *Attorney, Agent, or Firm* — Baker Botts L.L.P.

(57) ABSTRACT

In one embodiment, an apparatus includes a physical port and a plurality of logical sub-interfaces under the physical port. The physical port and the logical sub-interfaces are configured as a Bidirectional Forwarding Detection (BFD) neighbor group. The physical port being configured to run BFD sessions to detect failures at a first rate that is substantially faster as compared to a second rate of BFD sessions to detect failures on the logical sub-interfaces. The physical port notifies the logical sub-interfaces of a BFD failure at the physical port, with the logical sub-interfaces shutting down responsive to the notification.

19 Claims, 4 Drawing Sheets

SCALING BFD SESSIONS FOR NEIGHBORS USING PHYSICAL / SUB-INTERFACE RELATIONSHIPS

TECHNICAL FIELD

This disclosure relates generally to the field of digital computer networks; more particularly, to routing of data packets and protocols for scaling of failure detection in network sessions.

BACKGROUND

A LAN is a high-speed network that supports many computers connected over a limited distance (e.g., under a few hundred meters). A Virtual Local Area Network (VLAN) is a mechanism by which a group of devices on one or more LANs is configured using management software so that they can communicate as if they were attached to the same LAN, when in fact they are located on a number of different LAN segments. After a VLAN has been created, individual switch ports (also referred to as "access ports") are assigned to the VLAN. These access ports provide a connection for end-users or node devices, such as a router or server. A router is simply a device or, in some cases, software in a computer, that determines the next network point to which a packet should be forwarded toward its destination.

Bidirectional Forwarding Detection (BFD) is a network protocol, standardized in an Internet Engineering Task Force (IETF) working group, which is used to detect faults between two forwarding engines (e.g., routers or switches). In a typical application, BFD may require 50-150 ms to detect a link failure. According to BFD, sessions are explicitly configured between L3 endpoint neighbors—neighbors at Physical layer L1, Logical Layer L2 over switches or IP Datagram Layer over Routers. A session may operate either in asynchronous mode or demand mode. In asynchronous mode, both endpoints periodically send "Hello" packets to each other. (A Hello packet is basically a "keep alive" message sent by one device to another to check that the connectivity—over physical link, hardware and software paths—between the two L3 Neighbors is operating. The BFD hello mechanism provides detection of failures in a path between adjacent L3 Neighbors, linked over physical media, switches, and routers, switching and routing over forwarding engines, or on any kind of path between systems, including virtual circuits and tunnels.) If a number of the hello packets are not received in a timely fashion, a BFD session between L3 neighbors is considered down. In other words, failure of reachability to a neighbor, for whatever reasons, is detected when packets are not being received or sent. In demand mode, no Hello packets are exchanged after the BFD session is established; rather, it is assumed that the endpoints have another way to verify connectivity to each other, perhaps on the underlying physical layer. However, either host may still send Hello packets if deemed necessary. Regardless of which mode is in use, either endpoint may also initiate an "Echo" function. When this function is active, a stream of Echo packets is sent, and the other endpoint then sends these back—loopbacks—to the sender via its forwarding plane. This function is used to test the forwarding and receiving paths to and from the remote system. Pairing of neighbors to form a BFD Sessions between local and remote is typically per physical port and per sub-interface, which causes large scaling problems, e.g., as number of BFD Sessions multiply and CPU computational overhead increases, and also as the number of sub-interfaces increases (e.g., >1000).

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

Figure 1:
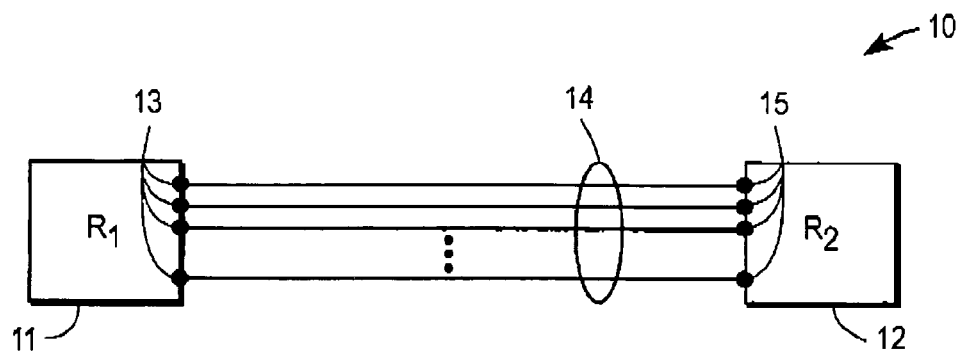
FIG. 1 illustrates an example network connection between two neighboring routers.

In the following description specific details are set forth, such as device types, system configurations, communication methods, etc., in order to provide a thorough understanding of the present invention. However, persons having ordinary skill in the relevant arts will appreciate that these specific details may not be needed to practice the embodiments described.

In the context of the present application, a computer network is a geographically distributed collection of interconnected sub-networks for transporting data between nodes, such as intermediate nodes and end nodes (also referred to as endpoints). A local area network (LAN) is an example of such a sub-network; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

A sub-interface is any one of a number of logical interfaces associated with a router's physical interface. Once a sub-interface has been created, a router treats this logical interface just like any physical interface. A "link" refers to a connection between adjacent or neighboring nodes of a network. As it is used in the present disclosure, a link not limited to a direct connection, but may encompass a path that is routed over multiple hops or other paths, e.g., a Multi-protocol Label Switching (MPLS) over a Label Switched Path (LSP). An endpoint (i.e., a sender or receiver) device represents any equipment, node, or other device capable of sending and/or receiving data packets, including any other device, component, element, or object capable of sending, receiving BFD packets, or otherwise participating in BFD packet exchanges.

In one embodiment, the concept of hierarchy is introduced into BFD detection as between physical interfaces and sub-interfaces of a network node. For example, a physical port or interface of a node may be designated as a "parent" interface, with all sub-interfaces created under the physical port being designated as "child" interfaces. The parent and child interfaces (e.g., VLANs, Frame Relay (FR), Asynchronous Transfer Mode (ATM), Layer 2 Virtual Private Networks (L2VPNs) and Layer 3 Virtual Private Networks (L3VPNs) may be configured as a BFD neighbor group that is either created automatically (e.g. all sub-interfaces under a physical port are included) or via configuration (e.g., by a network administrator). Within a group, BFD sessions are run at a higher rate (i.e., shorter failure detection time) on the parent interface to detect failures faster, with children BFD session failures being run at a slower rate (i.e., longer failure detection time), or not running at all, i.e., the parent acting as a proxy for the child.

In one implementation, the parent-child hierarchical relationship confers a BFD policy on the respective interfaces, with certain specific actions taken from the parent to the children in a particular neighbor group. For example, a failure at the parent (e.g., physical interface) level automatically triggers notification to the child (e.g., sub-interface) level. Additionally, failure detection timers for BFD parents are set more aggressively (e.g., by a factor of 10) as compared to BFD children timers (if parent is not acting as a proxy for the child interface/BFD Session). In still other embodiments, a BFD policy may be configured in which children BFD sessions are automatically brought down whenever the number of children BFD sessions in the DOWN state equals or exceeds a predetermined threshold level. For instance, where the threshold level is set to three, failure of three out of five sub-interfaces results in all five of the sub-interfaces being brought down.

FIG. 1 example network 10 that includes a connection between two routers 11 & 12, labeled $R_1$ & $R_2$, respectively. In this embodiment, the connection comprises an Ethernet link 14. In other embodiments, link 14 may comprise a connection in accordance with any one of a number of different protocols and/or network types (e.g., ATM, FR, VLANs, VPNs, MPLS/LSPs, etc.). The example of FIG. 1 also shows a plurality of sub-interfaces 13 & 15 respectively associated with routers 11 & 12, each of which is associated with a primary physical interface (not explicitly shown). The BFD protocol runs between the peer devices ($R_1$ & $R_2$) on a per sub-interface basis. In the example shown, all Layer 2 triggers (e.g., Generic Attribute Registration Protocol (GARP) for Ethernet) are fed to the parent BFD session.

The parent-child relationship configured between the physical interface and the associated sub-interfaces on each router is such that the parent BFD sessions have relatively fast failure detection timers (e.g., 50 ms), while the child sessions have relatively slow or longer failure detection timer settings (e.g., 500 ms). As a logical partition of the parent interface, each child sub-interface inherits the physical characteristics of the parent. Furthermore, parent BFD sessions are run based on shorter (i.e., faster) failure detection time and children BFD sessions with longer (i.e., slower) failure detection time. The parent BFD session may signal each of the children BFD sessions based on a policy configured by the user. For example, the policy may be that once a failure is detected by the parent BFD session, all of the child BFD sessions of the same group (parent+children) are notified and/or shut down.

Practitioners in the art will appreciate that by configuring the child BFD sessions with a much longer failure detection timer setting relative to the parent interfaces, the overall keep-alive traffic is reduced considerably (lower BFD packets per second) as for a given group consisting of a physical interface and all associated sub-interfaces. Additionally, the system is able to accommodate a larger number of total child BFD sessions running due to decreased overall CPU loading. Session scalability is also improved by having correlated alarms in the hierarchical relationship between the parent and child BFD sessions.

Stated differently, the physical interfaces to each neighbor are treated differently than other types of interfaces (e.g. sub-interfaces) as far as BFD detection is concerned. The physical interfaces are probed faster to get faster error detection without the node getting slowed down due to a large number of interfaces to the neighbors.

Figure 2:
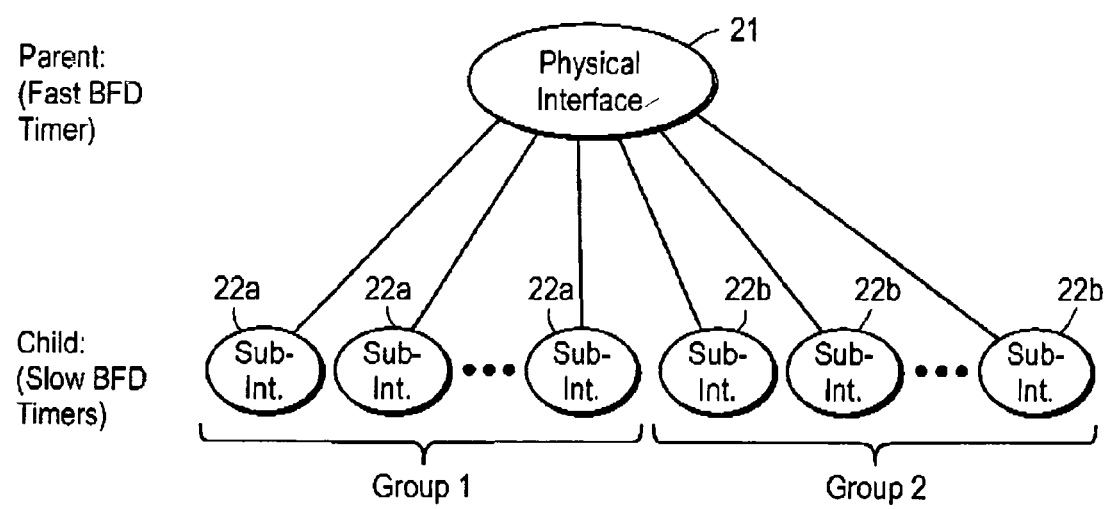
FIG. 2 illustrates an example network configuration with a physical interface/sub-interface hierarchical relationship.

FIG. 2 illustrates an example network configuration with a physical interface/sub-interface hierarchical relationship. The physical interface 21 is represented by ellipse 21, with the associated sub-interfaces being organized in to two sub-interface groups. Group 1 comprises a set of sub-interfaces 22a, and Group 2 comprises a set of sub-interfaces 22b. Note that physical interface 21, sub-interfaces 22a, and sub-interfaces 22b may collectively comprise a single Neighbor Group. In this example, the BFD policy configured by the hierarchical relationship is such that the parent interface (physical interface 21) has a fast BFD timer, and the children interfaces (sub-interfaces 22a & 22b) each have relatively slow BFD timers. In this embodiment, segregating the sub-interfaces into two separate groups allows for different policies/rules to be applied to each. For instance, the rule configured for sub-interfaces 22a in Group 1 may be that if ten or more of the child BFD sessions go down, all of the remaining sub-interfaces in the group are to be shut down. At the same time, a different rule may be applied to sub-interfaces 22b in Group 2 (e.g., the threshold for shutdown of all sub-interfaces being set at fifteen rather than ten). With respect to the parent-child relationship, the BFD policy may be configured such that all sub-interfaces 22a & 22b are notified and/or shutdown upon the detection of a BFD failure at the parent interface 21.

Figure 3:
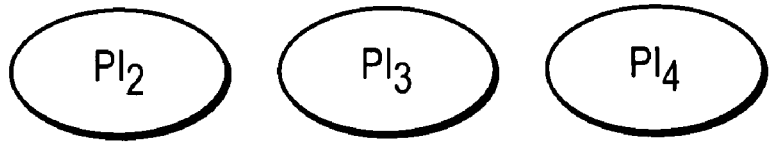
FIG. 3 illustrates an example network configuration with a hierarchical relationship between multiple physical interfaces.

FIG. 3 illustrates an example network configuration with a hierarchical relationship between multiple physical interfaces. In this embodiment, instead of the parent-child hierarchical relationship being between a physical interface (parent) and multiple sub-interfaces (children), the parent-child relationship is between multiple different physical interfaces. For example, a first physical interface ($PI_1$) is shown being configured as the parent, with all of the remaining physical interfaces ($PI_{1-4}$) in the Neighbor Group being configured as children. As was the case in the previous example, the parent interface is given a fast BFD timer in the children interfaces are each given relatively slow BFD timers.

Figure 4:
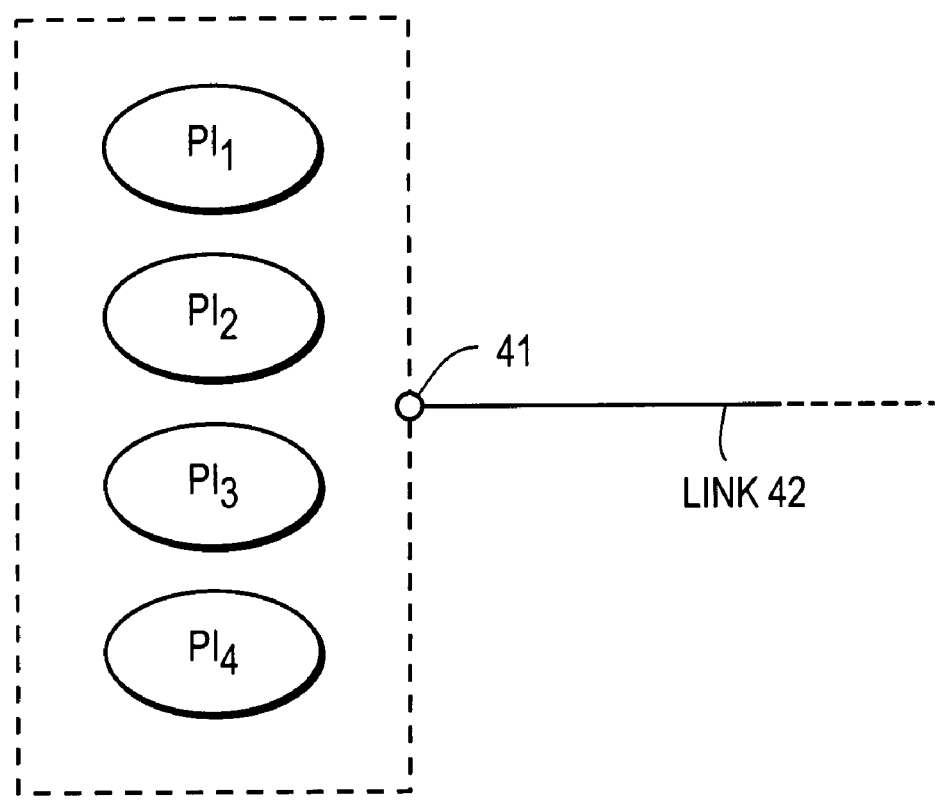
FIG. 4 illustrates another example network configuration with a group of physical interfaces logically grouped into an interface.

FIG. 4 illustrates another example network configuration with a group of physical interfaces ($PI_{1-4}$) logically grouped into an interface 41. The effect is to bundle a group of the physical interfaces into one logical interface. In this example, BFD is enabled on link 42. In this example, another physical interface (not shown) may be designated as a parent interface, with the group of physical interfaces ($PI_{1-4}$) being bundled together as the child interface for purposes of BFD policy. Note that as the user adds more sub-interfaces, each additional sub-interface inherits the parent-child relationship with the associated BFD policy (e.g., faster failure detection for the parent, slower failure detection for the children with the children being notified of failures at the parent level). Is further appreciated that by virtue of the parent-child relationship, the user or network administrator could deploy additional policy measures, i.e., actions to be taken from the parent to the child in the group.

Figure 5:
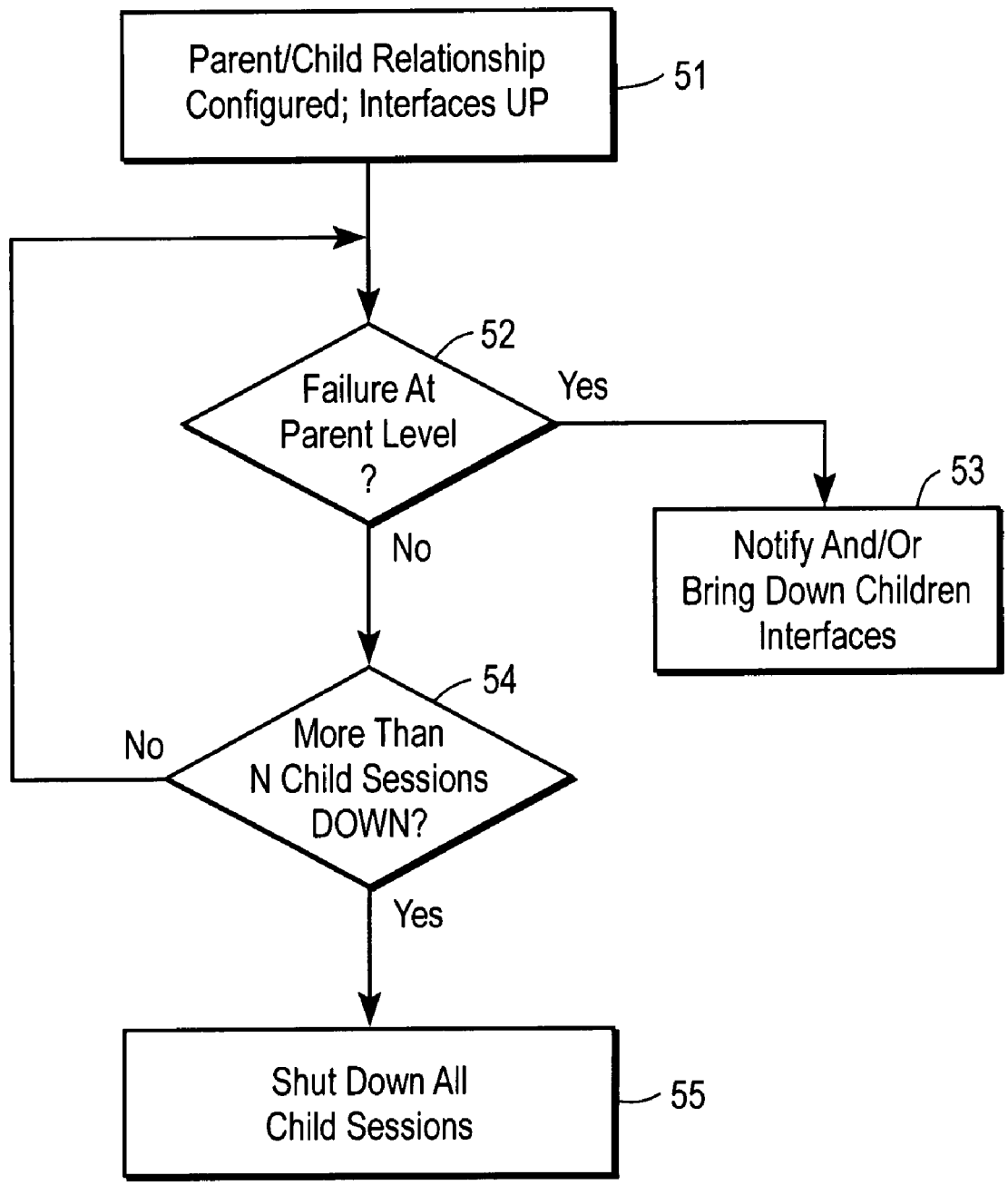
FIG. 5 illustrates an example method of operation for a parent interface/child interface relationship.

FIG. 5 illustrates an example method of operation for a parent interface/child interface relationship. The process begins with the parent-child hierarchical relationship being configured, for example, as between a primary, physical interface and a group of associated logical sub-interfaces. The parent and children interface collectively comprise a BFD neighbor group. Additionally, all of the interfaces are presently in an UP state in which BFD packet exchanges are occurring regularly. This is shown by block 51. According to the BFD policy configured for this group, the parent interface has fast BFD detection (i.e., a fast BFD timer) and the multiple children interfaces all have slow BFD detection (i.e., slow BFD timers) relative to the parent interface. By way of example, in one implementation the BFD timers of the children interfaces are at least ten times slower than that of the parent interface.

Once BFD is up and running, each of the respective interfaces is constantly monitored for a failure, e.g., the endpoint fails to receive back the Hello or Echo packets previously sent out as part of the keep-alive mechanism of the BFD protocol. In FIG. 5, monitoring for failure at the parent level is shown by decision block 52, with failure detection at the child level being shown by decision block 54. For example, if a failure is detected by BFD at the parent interface, the children interfaces may automatically be notified and/or brought down (DOWN state). This is shown occurring in block 53. With respect to the children interfaces, the configured BFD policy shown in this example is to shut down all the children interfaces if more than N out of a total of M children interfaces, where N and M are integers (N<M), have failed (i.e., DOWN). This is shown in the example of FIG. 5 by block 55. If neither of these events occurs, the process continues looping through blocks 52 & 54.

Figure 6:
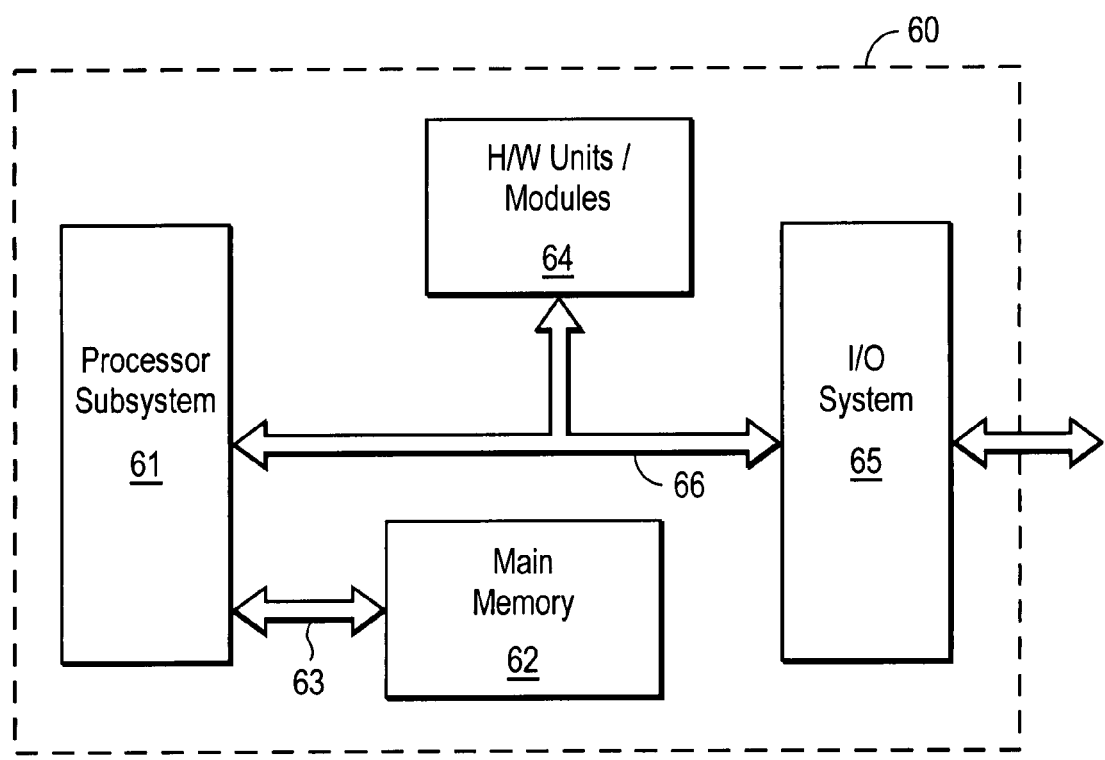
FIG. 6 illustrates an example network device or node.

FIG. 6 illustrates basic components of an example network device or node 60 (e.g., a router). Node 60 typically comprises a number of basic subsystems that includes a processor subsystem 61, a main memory 62 and an input/output (I/O) subsystem 65. Data is transferred between main memory ("system memory") 62 and processor subsystem 61 over a memory bus 63, and between the processor and I/O subsystems over a system bus 66. Examples of the system bus may include the conventional lightning data transport (or hyper transport) bus and the conventional peripheral component interconnect (PCI) bus. Node 60 may also comprise other hardware (or software) units/modules 64 coupled to system bus 66 for performing additional functions. Processor subsystem 61 may comprise one or more processors and a controller device that incorporates a set of functions including a system memory controller, support for one or more system buses and direct memory access (DMA) engines.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method comprising:
configuring a node of a network, the node comprising a physical interface and a plurality of logical sub-interfaces of the physical interface, with a Bidirectional Forwarding Detection (BFD) protocol policy wherein the physical interface and the plurality of logical sub-interfaces are configured as a BFD neighbor group, the configuration comprising:
configuring a physical interface BFD session to run on the physical interface with a first failure detection time; and
configuring a plurality of logical sub-interface BFD sessions to run on the plurality of logical sub-interfaces with a second failure detection time, wherein the second failure detection time is longer than the first failure detection time;
detecting a failure via the physical interface BFD session running on the physical interface; and
automatically notifying the plurality of logical sub-interfaces of the failure.

2. The method of claim 1 further comprising shutting down all of the plurality of logical sub-interfaces in response to detection of the failure at the physical interface.

3. The method of claim 1 wherein the detecting of the failure comprises:
periodically sending BFD packets to a remote BFD neighbor; and
determining that a number of the BFD packets are not received back from the remote BFD neighbor in a timely manner.

4. The method of claim 1 further comprising shutting down all the plurality of logical sub-interface BFD sessions running on the plurality of logical sub-interfaces when a certain number of the plurality of logical sub-interface BFD sessions on the plurality of logical sub-interfaces have failed.

5. The method of claim 1 wherein the second failure detection time is at least a factor of ten times longer than the first failure detection time.

6. A method comprising:
creating, on a network node comprising a physical port, a parent interface and a plurality of children interfaces of the parent interface as a Bidirectional Forwarding Detection (BFD) neighbor group on the network node, the parent interface being created on the physical port of the node;
running a parent BFD session at a particular rate to detect failures on the parent interface;
running a plurality of children BFD sessions to detect failures on the plurality of children interfaces substantially slower than the particular rate of the parent BFD session;
notifying the plurality of children interfaces of a failure on the parent interface; and
shutting down each of the plurality of children interfaces in response to detection of the failure.

7. The method of claim 6 wherein the plurality of children interfaces are created automatically as sub-interfaces under the physical port.

8. The method of claim 6 wherein the creating of the plurality of children interfaces comprises configuring the plurality of children interfaces as sub-interfaces under the physical port.

9. The method of claim 6 wherein:
the physical port is a first physical port;
the network node further comprises a second physical port; and
a selected one of the plurality of children interfaces is created on the second physical port.

10. The method of claim 6 wherein:
the network node further comprises a plurality of additional physical ports; and
a selected plurality of the plurality of children interfaces are created on the plurality of additional physical ports.

11. The method of claim 6 further comprising detecting the failure by:
periodically sending BFD packets to a remote BFD neighbor; and
determining that a number of the BFD packets are not received back from the remote BFD neighbor in a timely manner.

12. The method of claim 6 wherein the particular rate at which the parent BFD session is run is at least ten times faster as compared to the plurality of children BFD sessions.

13. A method comprising:
running, on a network node comprising a physical interface and a plurality of logical sub-interfaces of the physical interface, a plurality of Bidirectional Forwarding Detection (BFD) sessions, the physical interface and the plurality of logical sub-interfaces being configured as a BFD neighbor group, wherein running the plurality of BFD sessions comprises:
running a physical interface BFD session at a particular rate to detect failures on the physical interface; and
running a plurality of logical sub-interface BFD sessions to detect failures on the plurality of logical sub-interfaces substantially slower than the particular rate of the physical interface BFD session;
notifying the plurality of logical sub-interfaces of a failure on the physical interface; and
shutting down all of the plurality of logical sub-interface BFD sessions when a certain number of the plurality of logical sub-interface BFD sessions have failed.

14. The method of claim 13 further comprising shutting down each the plurality of logical sub-interfaces in response to detection of the failure on the physical interface.

15. The method of claim 13 further comprising detecting the failure by:
periodically sending BFD packets to a remote BFD neighbor; and
determining that a number of the BFD packets are not received back from the remote BFD neighbor in a timely manner.

16. An apparatus comprising:
a physical port; and
a plurality of logical sub-interfaces under the physical port, the physical port and the logical sub-interfaces being configured as a Bidirectional Forwarding Detection (BFD) neighbor group, the physical port being operable to notify the plurality of logical sub-interfaces of a BFD failure at the physical port, the logical sub-interfaces being configured to transition to a down state in response thereto; and
wherein a physical port BFD session is configured to run at a particular rate to detect failures on the physical port;
wherein a plurality of logical sub-interface BFD sessions are configured to run substantially slower to detect failures on the plurality of logical sub-interfaces than the particular rate of the physical port BFD session; and
wherein the plurality of logical sub-interfaces are configured such that all of the plurality of logical sub-interfaces transition to the down state in response to BFD failure of a selected number of the plurality of logical sub-interfaces, the selected number being less than a total number of logical sub-interfaces.

17. The apparatus of claim 16 wherein the particular rate at which the physical port BFD session is run is at least ten times faster as compared to the plurality of logical sub-interface BFD sessions.

18. The apparatus of claim 16 wherein the BFD neighbor group is configured for paired connection over a link to a remote BFD neighbor group.

19. The apparatus of claim 16 wherein the paired connection is per physical port and per logical sub-interface.

* * * * *